(12) United States Patent
A et al.

(10) Patent No.: US 11,689,419 B2
(45) Date of Patent: *Jun. 27, 2023

(54) SUPPORTING CONCURRENCY FOR GRAPH-BASED HIGH LEVEL CONFIGURATION MODELS

(71) Applicant: Juniper Networks, Inc., Sunnyvale, CA (US)

(72) Inventors: Chandrasekhar A, Bangalore (IN); Jayanthi R, Coimbatore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/248,268

(22) Filed: Jan. 15, 2021

(65) Prior Publication Data

US 2021/0144053 A1 May 13, 2021

Related U.S. Application Data

(63) Continuation of application No. 16/370,243, filed on Mar. 29, 2019, now Pat. No. 10,897,396.

(51) Int. Cl.
*H04L 41/082* (2022.01)
*H04L 43/045* (2022.01)

(52) U.S. Cl.
CPC .......... *H04L 41/082* (2013.01); *H04L 43/045* (2013.01)

(58) Field of Classification Search
CPC ............................. H04L 41/082; H04L 43/045
See application file for complete search history.

(56) References Cited

U.S. PATENT DOCUMENTS 5,870,559 A 2/1999 Leshem et al.
5,933,642 A 8/1999 Greenbaum et al.
(Continued)

FOREIGN PATENT DOCUMENTS

CN 102289384 A 12/2011
CN 104156230 A 11/2014
(Continued)

OTHER PUBLICATIONS

"Gremlin Docs," gremlindocs.spmallette.documentup.com, retrieved on Mar. 29, 2019, 34 pp.
(Continued)

*Primary Examiner* — Mohamed A. Wasel
*Assistant Examiner* — Zonghua Du
(74) *Attorney, Agent, or Firm* — Shumaker & Sieffert, P.A.

(57) ABSTRACT

A controller device manages a plurality of network devices. The controller device includes one or more processing units implemented in circuitry and configured to determine that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintain both the deployed graph model and an undeployed graph model including a second set of stateless intents including the one or more changed stateless intents; compile the changed stateless intents of the undeployed graph model to generate low-level configuration data for the network devices; and configure the network devices using the low-level configuration data.

17 Claims, 9 Drawing Sheets

(56) References Cited

U.S. PATENT DOCUMENTS

| | | | |
|---|---|---|---|
| 6,041,053 | A | 3/2000 | Douceur et al. |
| 6,078,744 | A | 6/2000 | Wolczko et al. |
| 6,298,321 | B1 | 10/2001 | Karlov et al. |
| 6,678,646 | B1 | 1/2004 | McConnell et al. |
| 6,973,488 | B1 | 12/2005 | Yavatkar et al. |
| 7,209,473 | B1 | 4/2007 | Mohaban et al. |
| 7,457,296 | B2 | 11/2008 | Kounavis et al. |
| 8,069,374 | B2 | 11/2011 | Panigrahy et al. |
| 8,266,416 | B2 | 9/2012 | Ishihara et al. |
| 8,571,882 | B1 | 10/2013 | Teitelbaum |
| 8,572,717 | B2 | 10/2013 | Narayanaswamy |
| 8,719,226 | B1* | 5/2014 | Jiang .................. G06F 16/219 707/649 |
| 9,117,071 | B2 | 8/2015 | Beretta et al. |
| 9,727,339 | B2 | 8/2017 | Zelsnack |
| 9,734,056 | B2 | 8/2017 | Shi et al. |
| 9,755,960 | B2 | 9/2017 | Moisand et al. |
| 9,979,738 | B2 | 5/2018 | Holland et al. |
| 10,102,172 | B1 | 10/2018 | Mai et al. |
| 10,148,506 | B1 | 12/2018 | Anburose et al. |
| 10,200,248 | B1 | 2/2019 | Jiang et al. |
| 10,278,112 | B1 | 4/2019 | A et al. |
| 10,374,886 | B1 | 8/2019 | A et al. |
| 10,382,265 | B1 | 8/2019 | Anburose et al. |
| 10,516,761 | B1 | 12/2019 | A et al. |
| 10,558,542 | B1 | 2/2020 | A et al. |
| 10,567,223 | B1 | 2/2020 | Sidaraddi et al. |
| 10,841,182 | B2 | 11/2020 | A et al. |
| 10,892,952 | B2 | 1/2021 | A et al. |
| 10,897,396 | B2 | 1/2021 | A et al. |
| 10,992,543 | B1* | 4/2021 | Rachamadugu ........ H04L 43/04 |
| 2004/0064538 | A1 | 4/2004 | Wong |
| 2009/0164773 | A1 | 6/2009 | Ishihara et al. |
| 2011/0307869 | A1 | 12/2011 | Cwalina et al. |
| 2012/0110028 | A1 | 5/2012 | Athreya et al. |
| 2013/0191766 | A1 | 7/2013 | Ragusa et al. |
| 2014/0181797 | A1 | 6/2014 | Beretta et al. |
| 2014/0280900 | A1* | 9/2014 | Mcdowall ............. H04L 41/122 709/224 |
| 2015/0381515 | A1 | 12/2015 | Mattson et al. |
| 2016/0026631 | A1* | 1/2016 | Salam ................ H04L 41/0803 707/694 |
| 2016/0050125 | A1 | 2/2016 | Mattson et al. |
| 2016/0062746 | A1 | 3/2016 | Chiosi et al. |
| 2016/0072676 | A1 | 3/2016 | Gomadam et al. |
| 2016/0197812 | A1 | 7/2016 | Kalkunte |
| 2016/0211988 | A1 | 7/2016 | Lucas et al. |
| 2016/0269250 | A1 | 9/2016 | Astigarraga et al. |
| 2016/0342397 | A1 | 11/2016 | Goetz et al. |
| 2016/0350095 | A1 | 12/2016 | Ramachandran et al. |
| 2017/0054758 | A1 | 2/2017 | Maino et al. |
| 2017/0099183 | A1 | 4/2017 | Vaidyanathan et al. |
| 2017/0127466 | A1 | 5/2017 | Narasimha |
| 2017/0187577 | A1 | 6/2017 | Nevrekar et al. |
| 2018/0150569 | A1 | 5/2018 | Wechsler et al. |
| 2018/0167277 | A1 | 6/2018 | Mahimkar et al. |
| 2018/0210927 | A1* | 7/2018 | Karam ................ G06F 16/9024 |
| 2018/0232402 | A1 | 8/2018 | Bhatti et al. |
| 2018/0276863 | A1 | 9/2018 | Nerurkar et al. |
| 2018/0329958 | A1 | 11/2018 | Choudhury et al. |
| 2018/0351806 | A1 | 12/2018 | Mohanram et al. |
| 2019/0013017 | A1 | 1/2019 | Kang et al. |
| 2019/0104026 | A1 | 4/2019 | Zhang et al. |
| 2019/0182119 | A1 | 6/2019 | Ratkovic et al. |
| 2019/0266619 | A1 | 8/2019 | Namba et al. |
| 2020/0084120 | A1 | 3/2020 | A et al. |
| 2020/0106658 | A1 | 4/2020 | A et al. |
| 2020/0274772 | A1 | 8/2020 | A et al. |
| 2020/0313957 | A1 | 10/2020 | A et al. |
| 2020/0412614 | A1 | 12/2020 | A et al. |

FOREIGN PATENT DOCUMENTS

| | | |
|---|---|---|
| CN | 104699508 A | 6/2015 |
| CN | 105376087 A | 3/2016 |
| CN | 107577709 A | 1/2018 |
| CN | 108667666 A | 10/2018 |
| CN | 109271621 A | 1/2019 |
| EP | 2961100 A1 | 12/2015 |
| FR | 2902954 A1 | 12/2007 |
| WO | 2017204872 A1 | 11/2017 |

OTHER PUBLICATIONS

"Gremlin," Github, github.com/tinkerpop/gremlin/wiki, Jul. 11, 2016, 4 pp.

"Introduction to GraphQL," https://graphql.org/learn/, Accessed Sep. 20, 2018, 3 pp.

"OpenConfig," Github, github.com/openconfig, retrieved on Mar. 29, 2019, 3 pp.

"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).

Athanas et al., "An Adaptive Hardware Machine Architecture and Compiler for Dynamic Processor Reconfiguration," Laboratory for Engineering Man/Machine Systems, Division of Engineering, Brown University, 1991, 4 pp.

Bierman et al., "RESTCONF Protocol," IETF, RFC 8040, Jan. 2017, 137 pp.

Bjorklund, "YANG—A Data Modeling Language for the Network Configuration Protocol (NETCONF)," Internet Engineering Task Force, RFC 6020, Oct. 2010, 174 pp.

Byron, "GraphQL: A data query language," https://code.fb.com/core-data/graphql-a-data-query-language/, Posted Sep. 14, 2015, 5 pp.

Cechak, "Using GrahpQL for Content Delivery in Kentico Cloud," Masaryk University Faculty of Informatics, Bachelor's Thesis, Fall 2017, 63 pp.

Enns, "NETCONF Configuration Protocol," Network Working Group, RFC 4741, Dec. 2006, 96 pp.

Extended Search Report from counterpart European Application No. 19181698.2, dated Oct. 15, 2019, 10 pp.

Harrington et al., "An Architecture for Describing Simple Network Management Protocol (SNMP) Management Frameworks," RFC 3411, Network Working Group, Dec. 2002, 65 pp.

Nguyen, "Model-based Version and Configuration Management for a Web Engineering Lifecycle," Proceedings of the 15th International Conference on World Wide WEB, ACM, New York, NY, May 23, 2006, 10 pp.

Ribeiro et al., "G-Tries: an efficient data structure for discovering network motifs," Proceedings of the 2010 ACM Symposium on Applied Computing, New York, NY, Mar. 22, 2010, 8 pp.

Sadasivarao et al., "Demonstration of Advanced Open WDM Operations and Analytics, based on an Application-Extensible, Declarative, Data Model Abstracted Instrumentation Platform," 2019 Optical Fiber Communications Conference and Exhibition, OSA, Mar. 3, 2019, 3 pp.

Sivakumar et al., "Concepts of Network Intent," draft-moulchan-nmrg-network-intent-concepts-00, Internet Research Task Force, Oct. 28, 2017, 10pp.

Wallin et al., "Automating Network and Service Configuration Using NETCONF and YANG," Sep. 23, 2011, 13 pp.

Prosecution History from U.S. Appl. No. 16/370,243, dated Apr. 20, 2020 through Sep. 22, 2020, 43 pp.

U.S. Appl. No. 17/099,533, filed Nov. 16, 2020, naming inventors A et al.

First Office Action and Search Report, and translation thereof, from counterpart Chinese Application No. 201910936240.5, dated Apr. 21, 2021, 12 pp.

(56) References Cited

OTHER PUBLICATIONS

Response to Extended Search Report dated Oct. 15, 2019 from counterpart European Application No. 19181698.2, filed Mar. 29, 2021, 18 pp.

\* cited by examiner

SUPPORTING CONCURRENCY FOR GRAPH-BASED HIGH LEVEL CONFIGURATION MODELS

This application is a continuation of U.S. application Ser. No. 16/370,243, filed Mar. 29, 2019, the entire content of which is incorporated herein by reference.

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, the controller device allows administrators to describe an intended network/compute/storage state as an "intent data model," which may be represented as a graph model. The controller device may support parallel and incremental compilation and extensibility of the intent data model using reactive mappers.

In one example, a method of managing a plurality of network devices includes determining, by a controller device that manages the plurality of network devices, that one or more stateful intents used to manage the plurality of network devices and represented by a graph model are degraded due to statefulassigned resources for the stateful intents having become degraded; in response to determining that the one or more stateful intents are degraded, determining, by the controller device, new resources for the stateful intents, the new resources corresponding to vertices of the graph model; provisioning, by the controller device, the stateful intents using the determined resources; determining, by the controller device, whether the provisioning of the stateful intents was successful; compiling, by the controller device, at least one of the stateful intents that was successful into low-level configuration data for at least one network device of the plurality of network devices; and configuring, by the controller device, the at least one network device using the low-level configuration data.

In another example, a controller device manages a plurality of network devices. The controller device includes one or more processing units implemented in circuitry and configured to determine that one or more stateful intents used to manage the plurality of network devices and represented by a graph model are degraded due to assigned resources for the stateful intents having become degraded; in response to determining that the one or more stateful intents are degraded, determine resources for the stateful intents, the resources corresponding to vertices of the graph model; provision the stateful intents using the determined resources; determine whether the provisioning of the stateful intents was successful; compile at least one of the stateful intents that was successful into low-level configuration data for at least one network device of the plurality of network devices; and configure the at least one network device using the low-level configuration data.

In another example, a computer-readable storage medium has stored thereon instructions that, when executed, cause a processor of a controller device that manages a plurality of network devices to determine that one or more stateful intents used to manage the plurality of network devices and represented by a graph model are degraded due to assigned resources for the stateful intents having become degraded; in response to determining that the one or more stateful intents are degraded, determine resources for the stateful intents, the resources corresponding to vertices of the graph model; provision the stateful intents using the determined resources; determine whether the provisioning of the stateful intents was successful; compile at least one of the stateful intents that was successful into low-level configuration data for at least one network device of the plurality of network devices; and configure the at least one network device using the low-level configuration data.

In another example, a method of managing a plurality of network devices includes determining, by a controller device that manages a plurality of network devices, that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintaining, by the controller device, both the deployed graph model and an undeployed graph model including a second set of stateless intents including the one or more changed stateless intents; compiling, by the controller device, the changed stateless intents of the undeployed graph model to generate low-level configuration data for the network devices; and configuring, by the controller device, the network devices using the low-level configuration data.

In another example, a controller device manages a plurality of network devices. The controller device includes one or more processing units implemented in circuitry and configured to determine that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintain both the deployed graph model and an undeployed graph model including a second set of stateless intents including the one or more changed stateless intents; compile the changed stateless intents of the undeployed graph model to generate low-level configuration data for the network devices; and configure the network devices using the low-level configuration data.

In another example, a computer-readable storage medium has stored thereon instructions that, when executed, cause a processor of a controller device that manages a plurality of network devices to determine that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintain both the deployed graph model and an undeployed graph model including a second set of stateless intents including the one or more changed stateless intents; compile the changed stateless intents of the undeployed graph model to generate low-level configuration data for the network devices; and configure the network devices using the low-level configuration data.

The details of one or more examples are set forth in the accompanying drawings and the description below. Other features, objects, and advantages will be apparent from the description and drawings, and from the claims.

DETAILED DESCRIPTION

Figure 1:
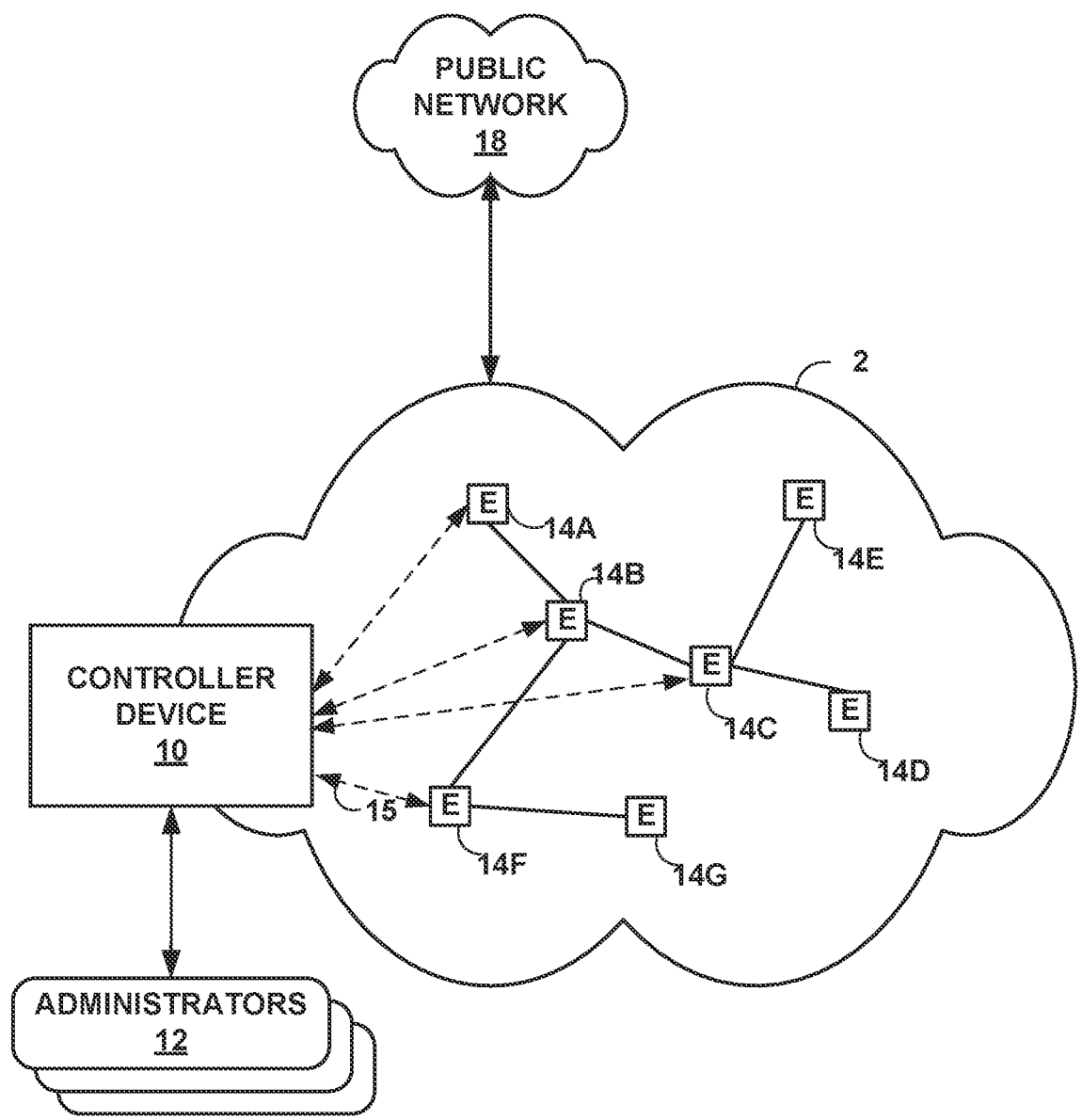
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data changes, e.g., device configuration additions and removals. That is, y1=f1(x), y2=f2(x), yN=fN(x).

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In general, customer environments are configured to allow customers (e.g., administrators 12) to control intent realization and assure programmed intents. The techniques of this disclosure support customer requirements to support service layer agreements (SLA) in near real time. In this manner, customers' businesses will not be negatively impacted by intent realization. If resources for stateful intents become degraded (e.g., unreachable, highly utilized, or other issues on a corresponding device), controller device 10 may select appropriate resources to generate the desired configuration in near real time.

This disclosure describes techniques by which controller device 10 can support SLA in near real time. For example, controller device 10 may support concurrent intent provisioning. Controller device 10 may use enhanced resource matching filters to include and exclude certain system resources. Controller device 10 may further maintain the network in a consistent state while managing business SLA. Controller device 10 may also support concurrent stateless intent provisioning. That is, controller device 10 may support concurrent intent updates without invalidating other intent changes. Controller device 10 may also support a current version of an intent graph until pending changes have been deployed.

U.S. application Ser. No. 16/125,245, entitled "DYNAMIC INTENT ASSURANCE AND PROGRAMMABILITY IN COMPUTER NETWORKS," filed Sep. 7, 2018, and incorporated herein by reference in its entirety, describes resource filter query semantics as below:

```
site(name: "Bangalore" ) {
    @Resource("PE") device(role: "PE", bgp-session-count<1000) ) {
        //"@Resource" signify it is a resource with name PE .
        id,
        @Resource("PE-Port") interface ( min:latency ) {
        //"@Resource"
            signify it is a resource with name PE-PORT
            name
        }
    }
}
```

From this, controller device 10 may derive decision variables, objective, and constraints. Controller device 10 may enhance the query to support extended resources and included resources, e.g., as shown below:

```
site(name: "Bangalore" ) {
    @Resource("PE") device(role: "PE", bgp-session-count<1000, excluded: {d1,
        d2}, included: {d3}) ) { //"@Resource" signify it is a resource with
        name PE .
        id,
        @Resource("PE-Port") interface ( min:latency ) { //"@Resource"
            signify it is a resource with name PE-PORT
            name
        }
    }
}
```

The excluded list may become a constraint to the resource selection optimization algorithm, while the included list may also become a constraint to the resource selection optimization algorithm. In the example above, the constraints include limits on resources defined as "not in {d1, d2}" and "in {d3}."

Figure 2:
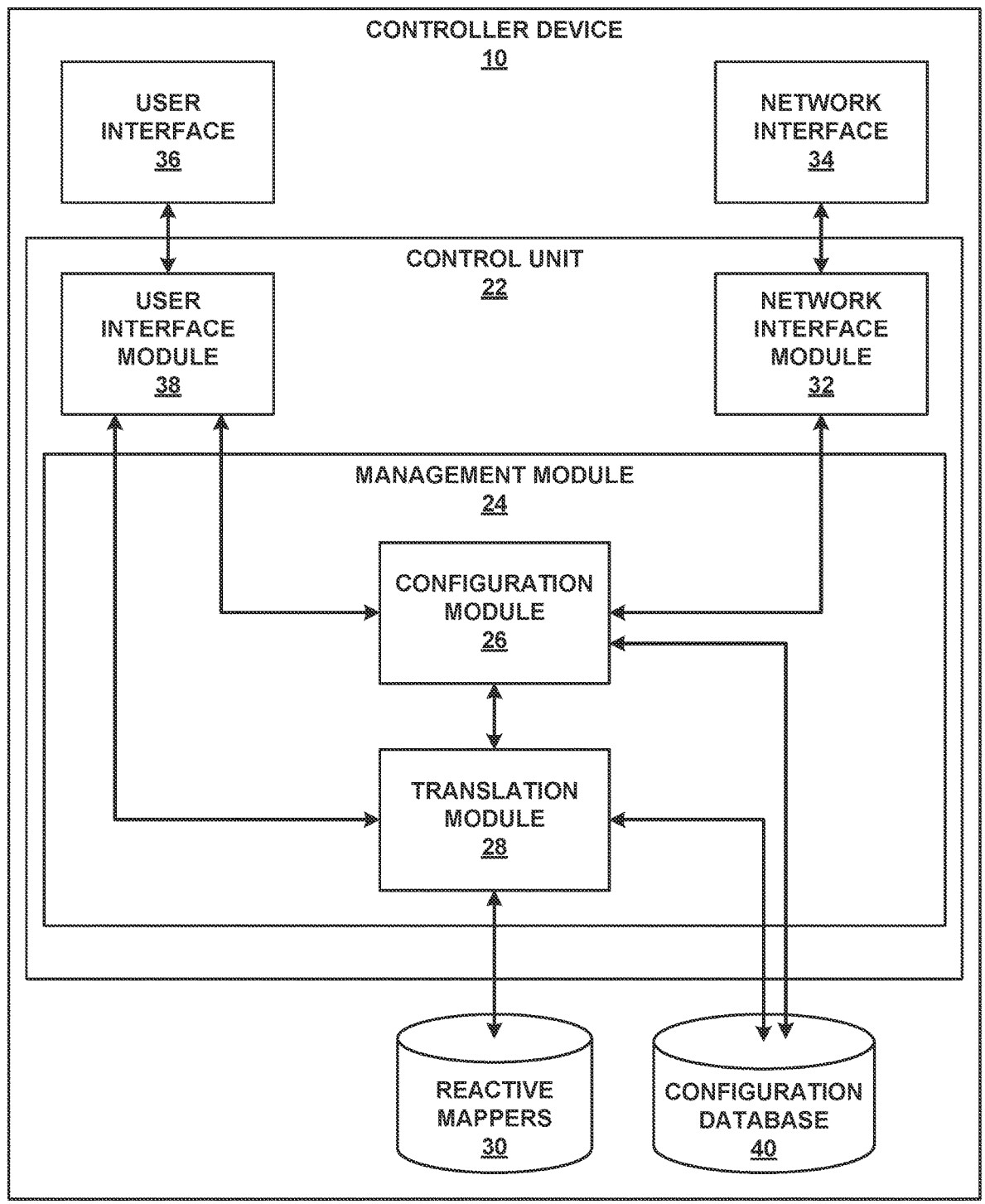
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 generally includes information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14). In accordance with the techniques of this disclosure, configuration database 40 may include a unified intent data model.

Translation module 28 determines which of reactive mappers 30 to execute on the intent data model based on the information of configuration database 40, e.g., which of the devices are to receive the low-level configuration instructions. Translation module 28 then executes each of the determined reactive mappers of reactive mappers 30, providing the intent data model to the reactive mappers as input and receiving low-level configuration instructions. Translation module 28 may also be referred to as an intent compiler, which is a service containing a set of mappers, such as reactive mappers 30.

Configuration module 26 may first determine an existing intent data model for each service performed by the devices for which configuration is to be updated, e.g., by retrieving the intent data model for each of the services from configuration database 40. Configuration module 26 may then compare the existing intent data model (also referred to herein as a deployed graph model) to the newly received intent data model, and determine differences between the existing and newly received intent data models (also referred to as an undeployed graph model). Configuration module 26 may then add these changes to the compiler stream, and reactive mappers 30 may then translate these changes to low-level configuration information. The changes may be included in a change set, which may be a list containing intent graph vertices and corresponding version identifiers. Management module 24 may use the change set to track the list of vertices changed in an intent update. After the intent has been committed, management module 24 may use the change set to update vertex states in the intent graph model. Configuration module 26 also updates the existing intent data model recorded in configuration database 40 based on the newly received intent data model.

In some examples, reactive mappers 30 that perform update translations (that is, translating changes in the unified intent data model that results in updates to values of low-level configuration information, without creation or deletion of elements in the low-level configuration data) may operate as follows. In one example, the reactive mappers 30 that perform updates may override single elements. That is, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent data model vertices. Because each vertex has its own corresponding reactive mapper, compilation can be performed in parallel. That is, the reactive mappers of each of the vertices of the graph model representing the unified intent data model can be executed in parallel, thereby achieving parallel compilation. Translation module 28 may be configured to allow processing of only impacted intent data model data changes (i.e., those elements in the intent data model that are impacted by the changes). Based on reactive mappers 30, translation module 28 may infer dependencies across vertices in the intent data model. When the intent data model is changed, translation module 28 may publish messages in the compiler stream based on a dependency graph, as discussed above.

When a "create" template is uploaded (that is, a reactive mapper of reactive mappers 30 that processes new data in intent data model configuration information, relative to existing intent data model configuration information), translation module 28 may determine the dependencies using the dependency graph. When the service is changed, translation module 28 may generate a difference between the existing intent data model configuration information and the new intent data model configuration information, based on the dependencies. Translation module 28 may then use the reactive mapper of reactive mappers 30 to process the difference, and thereby translate the intent data model configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

In accordance with techniques of this disclosure, management module 24 maintains configuration database 40 to represent a current set of stateless intents according to which elements 14 (FIG. 1) are configured. As discussed above, configuration database 40 may include a graph model of the statelessintents. Controller device 10 may then receive one or more new intents from a user (e.g., one of administrators 12 of FIG. 1) via user interface module 38 and user interface 36. Management module 24 may determine whether one or more resources for any of the existing stateful intents of configuration database 40 are degraded.

When one or more of the resources are degraded (and thus, the stateful intents are degraded), management module 24 may determine new resources to be allocated to the degraded stateful intents. The resources may correspond to vertices of the graph model of configuration database 40. For instance, the vertices may represent devices or services, such as elements 14 or services provided by elements 14.

After determining which resources to use, management module 24 may provision the stateful intents using the determined resources. Management module 24 may further determine whether the provisioning was successful. Translation module 28 may compile those stateful intents for which provisioning was successful into low-level configuration data for one or more of elements 14. Configuration module 26 may then configure elements 14 using the low-level configuration data.

Management module 24 may determine a resolution for provisioning those intents for which the attempted provisioning was not successful. For example, as explained in greater detail below with respect to the flowcharts of FIGS. 5 and 6, management module 24 may determine whether provisioning failures were due to semantic failures or unreachable resources (that is, network elements such as elements 14 not being reachable). If the failure is due to new resources that are unreachable, management module 24 may get new resources by including the resources in excluded list and provision the network. If the failure due to existing resources are unreachable, management module 24 may keep old resources list and provision the network. For semantic failures, management module 24 may cancel the stateful intents and output an alert via user interface module 38 to user interface 36 representing the semantic failures for the corresponding stateful intents. Failed semantic intents may be negated, and such intents may be referred to as negated intents, representing a change to the intent data model to nullify the intent change. For instance, if an intent change were made to detect traffic flow and trigger a GRE/IPSEC tunnel between two network sites that failed, the negated intent may be to remove the tunnel between the two network sites.

Additionally, controller device 10 may determine whether one or more stateless intents of the graph model of configuration database 40 have changed. As discussed above, stateless intents may correspond to fully declarative descriptions of an intended state of, e.g., network 2 of FIG. 1, including network devices (e.g., elements 14), states of one or more of the network devices, and/or state of storage for the network.

In general, business policy changes rely on atomicity, consistency, isolation, and durability in the stateless intent layer. Atomicity refers to all device changes being committed, or nothing is committed. Consistency means that configuration committed to a device should be valid. Eventual consistency is sufficient across the devices, as controller device 10 already provides strong consistency for the intent view. Transaction isolation at the intent data model supports concurrent intent updates. Durability of the intent data model is also important.

Atomicity is provided by default, because management module 24 brings network 2 into a consistent state. The stateless intent layer may include application programming interfaces (APIs) that are idempotent, because changes may not be committed to certain endpoints in an initial deployment. Netconf supports merge and remove operations that can be used to achieve idempotency.

In accordance with the techniques of this disclosure, controller device 10 may ensure that configuration data committed to elements 14 are valid. Eventual consistency is provided across elements 14, because controller device 10 provides strong consistency for the intent view. The intent datastore (e.g., configuration database 40) provides strong consistency. When the intent data model is edited, the change alone is not sufficient for transformation. Thus, controller device 10 may use a dependent intent data model to transform changes. If the dependent intent data model is edited concurrently, intent changes may override other intent changes. Controller device 10 may be configured to ensure that one intent change does not override another intent change. This may be achieved through the global intent version discussed above. That is, the global intent version signifies the version of the intent graph that was used to generate low-level model resources. This is maintained along with the low-level model resource. If the newly generated low-level model version is less than the version on the low-level model, controller device 10 may rerun translation module 28.

The intent data store included in configuration database 40 provides isolation of the intent data model across translations. Likewise, the intent data store included in configuration database 40 also provides durability.

In general, management module 24 may maintain two versions of the graph model in configuration database 40. Management module 24 may maintain both a deployed graph model corresponding to currently deployed configuration data to elements 14, as well as an undeployed graph model that includes data representing the changed stateless intents (e.g., added or updated stateless intents, and omitting deleted stateless intents, relative to the deployed graph model). Additionally, management module 24 may maintain version values for each full graph model, as well as version values for individual vertices within the graph models. Global intent versions represent versions of an intent used to compile to a low-level model, and a time stamp may be used as the global intent version.

Management module 24 may further maintain an abstract configuration model representing a common, low-level model for a device that would be used for intent transformation. Management module 24 may also maintain intent dependent information, representing reference information saved in the abstract configuration model that signifies intents generated through the abstract configuration model.

As discussed in greater detail below, to maintain various version values, management module 24 may maintain a snapshot table including universally unique identifiers (UUIDs) for vertices of the graph models. Management module may set a state for newly created vertices of the undeployed graph model to a "create" state. Management module may set a state for updated vertices of the undeployed graph model to an "update" state. Management module may set a state for deleted vertices of the undeployed graph model to a "delete" state.

Management module 24 may cause translation module 28 to compile the changed stateless intents of the undeployed graph model to generate low-level configuration data for the network devices, e.g., elements 14. In general, translation module 28 may compile two or more concurrently changed stateless intents that do not conflict with each other concurrently (e.g., in parallel), and may prevent the changed stateless intents from invalidating each other. Likewise, translation module 28 may also translate any dependent stateless intents that depend from a changed stateless intent in the graph model, as indicated by a dependency graph.

Configuration module 26 may then configure elements 14 using the low-level configuration data by distributing the configuration data to respective elements 14 via network interface module 32 and network interface 34. After deploying the low-level configuration data, management module 24 may replace the deployed graph model of configuration database 40 with the undeployed graph model, and then update the undeployed graph model when new intent changes are received.

Controller device 10 may use an abstract model as a common low-level model. The abstract model is a vendor agnostic model. OpenConfig, described at openconfig.net and github.com/openconfig, is commonly used as a vendor agnostic model, expressed in YANG. Controller device 10 may use an extension to the vendor agnostic model to denote resources, including properties such as in the following example:

```
grouping intent_dependency {
    leaf global_version{
        type uint64;
        description "Version of the Intent used to compile to Low
        level model.
    ";
    }
    List intent_list{
        leaf id{
            type uint64;
            description "Version of the Intent used to compile to Low
            level
            model. ";
        }
        leaf type{
            Type string;
            description "Intent type";
        }
    }
}
Ex:
list vlan{
    uses Intent_dependency;
    ext:resource{
        resource-key 'vlan-id
    }
}
```

To extend a business policy, a user (e.g., one of administrators 12) may program a resource collector. To extend a stateless intent data model, the user may augment an intent data model and augment compilation logic (e.g., one of reactive mappers 30).

To augment the intent data model, in case of YANG, the user may write a new YANG submodule. This may introduce new graph vertices and associations to the vertices. To add a new reference, the user may add a vertex and add ref-edge associations to one or more of the existing vertices. A similar approach can be followed for the YAML model.

As noted above, the user may also augment compilation logic with transaction support. The compilation logic may be implemented as the collection of reactive mappers 30. Each reactive mapper may take a global version identifier value. Each reactive mapper may generally perform the following: read low level resources and check if existing resource global_version is greater than the global version. If the existing resource version is greater than the global version, retry, otherwise, update low-level resources and version. An example REST API for updating low-level resources is "POST: http://127.0.0.1:8084/ems-central/vlan/1234? intent global version=1234."

Management module 24 may document intent deployment, e.g., after updating configuration of elements 14, with a deployment reply message. The following is an example deployment reply message:

```
<deployment-reply message-id="101"> ### Message -id: Asynch transaction id
    <ok device="12345" />
    <error device="1234" >
        <error-type>sub-transaction failed </error-type>
            <error-tag>403</error-tag>
            <error-severity>error</error-severity>
            <error-message>
                device not reachable
            </error-message>
    </error>
</deployment-reply>
```

In this manner, controller device 10 represents an example of a controller device that manages a plurality of network devices and includes one or more processors implemented in circuitry and configured to determine that one or more stateful intents used to manage the plurality of network devices and represented by a graph model are degraded due to assigned resources for the stateful intents having become degraded; in response to determining that the one or more stateful intents are degraded, determine resources for the stateful intents, the resources corresponding to vertices of the graph model; provision the stateful intents using the determined resources; determine whether the provisioning of the stateful intents was successful; compile at least one of the stateful intents that was successful into low-level configuration data for at least one network device of the plurality of network devices; and configure the at least one network device using the low-level configuration data.

Controller device 10 also represents an example of a controller device that manages a plurality of network devices and includes one or more processors implemented in circuitry and configured to determine that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintain both the deployed graph model and an undeployed graph model including a second set of stateless intents including the one or more changed stateless intents; compile the changed stateless intents of the undeployed graph model to generate low-level configuration data for the network devices; and configure the network devices using the low-level configuration data.

Figure 3:
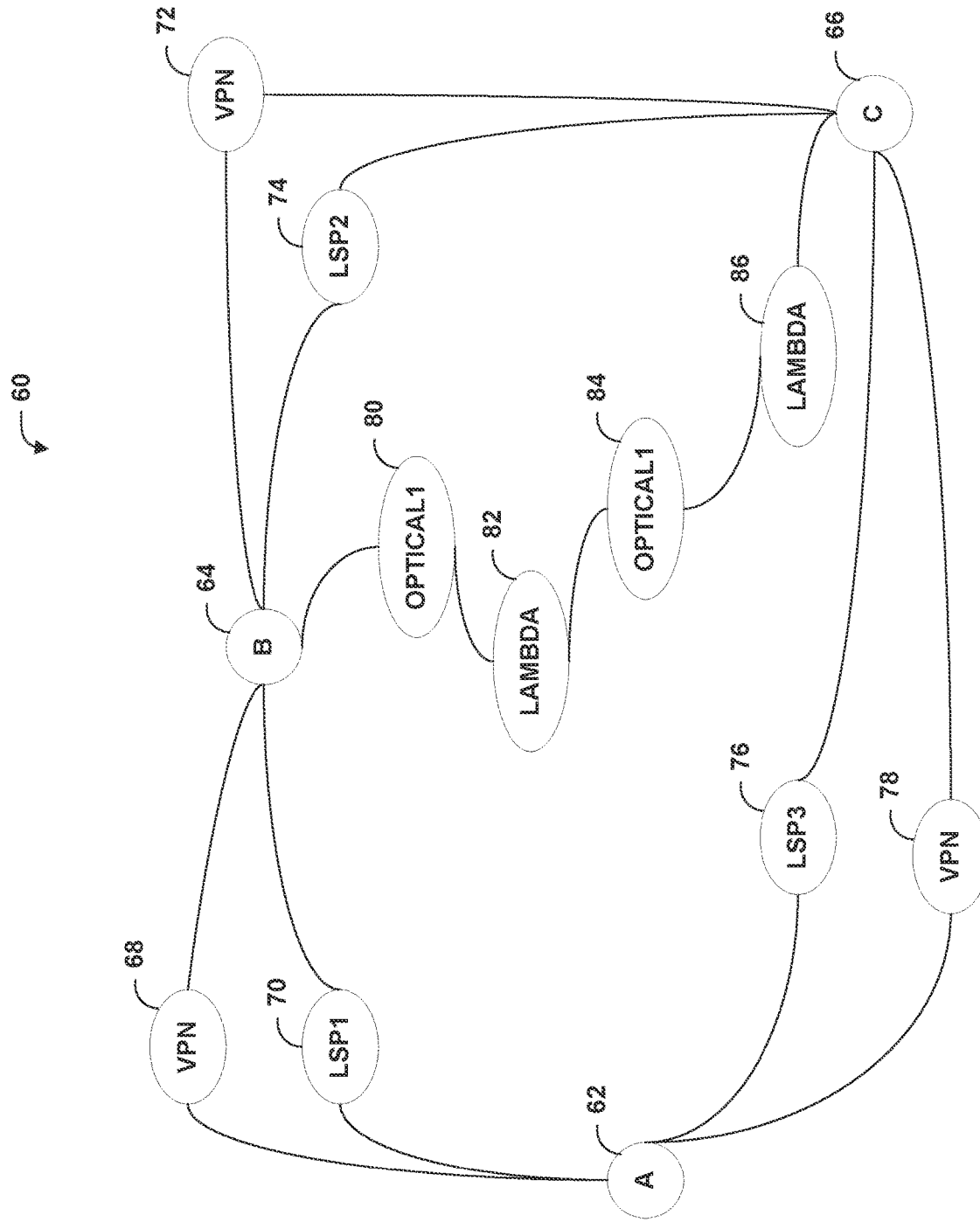
FIG. 3 is a conceptual diagram illustrating an example unified graph model for an intent data model.

FIG. 3 is a conceptual diagram illustrating an example unified graph model 60 for an intent data model. Unified graph model 60, in this example, includes nodes A 62, B 64, and C 66, among others. Initially, unified graph model may not include VPN 68, VPN 72, and VPN 78, nor opticall 80, lambda 82, opticall 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76. Furthermore, as a result of additional capacity being required as an optical intent, additional nodes optical 1 80, lambda 82, optical 1 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . . " This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. applicant Ser. No. 15/462, 465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

Figure 4:
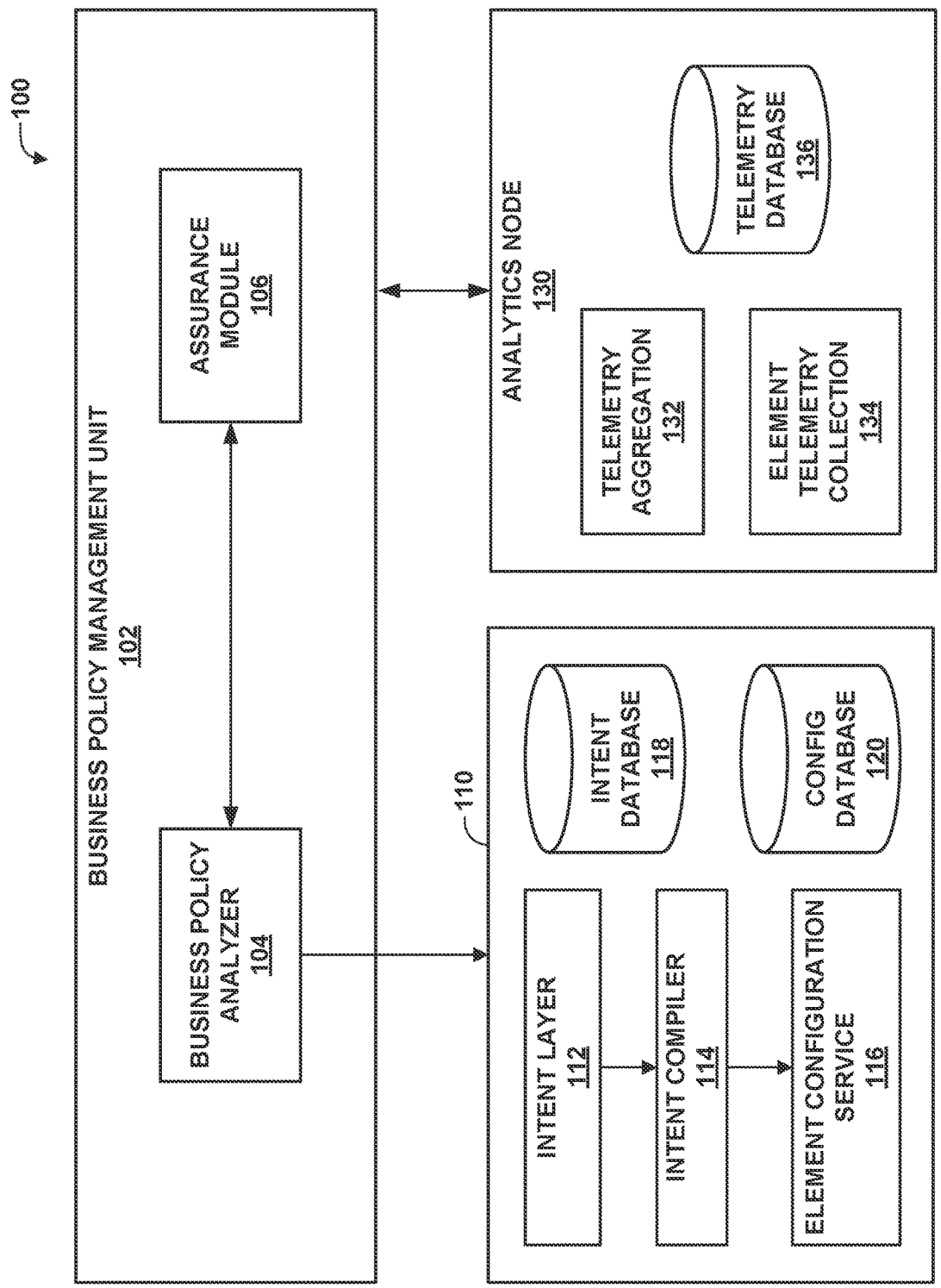
FIG. 4 is a conceptual diagram illustrating an example model of components of a controller device, such as the controller device of FIGS. 1 and 2, according to techniques of this disclosure.

FIG. 4 is a conceptual diagram illustrating an example model 100 of components of a controller device, such as controller device 10, according to techniques of this disclosure. In this example, model 100 includes business policy management unit 102, intent infrastructure 110, and analytics node 130. Business policy management unit 102 includes business policy analyzer 104 and assurance module 106. Intent infrastructure 110 includes intent layer 112, intent compiler 114, element configuration service 116, intent database 118, and configuration (config) database 120. Analytics node 130 includes telemetry aggregation unit 132, element telemetry collection 134, and telemetry database 136. Management module 24 of FIG. 2 may include components that perform the functionality attributed to various components of model 100. For example, configuration module 26 of FIG. 2 may correspond to intent infrastructure 110, translation module 28 may correspond to intent compiler 114, configuration database 120 may correspond to configuration database 40 and so on. Certain components shown in FIG. 4 may be implemented by management module 24 of FIG. 2.

In general, business policy analyzer 104 manages stateful intents. Business policy analyzer 104 communicates with assurance module 106 to obtain resources for the stateful intents. Business policy analyzer 104 also calls intent layer 112 to provision stateless intents. The techniques of this disclosure may be used to ensure business policies are translated to the network in near real time to prevent negative impacts to SLA. Intent compiler 114 may be configured to compile intents concurrently. Additional details regarding parallel, concurrent compilation of intents are described in "SUPPORTING COMPILATION AND EXTENSIBILITY ON UNIFIED GRAPH BASED INTENT MODELS," U.S. application Ser. No. 16/282,160, filed Feb. 21, 2019, the entire contents of which are hereby incorporated by reference.

When a business policy (that is, stateful intent) is degraded, business policy analyzer 104 may determine the appropriate resources to address the degraded intent and call intent infrastructure 110 to provision the intents. When intent realization is failed, business policy analyzer 104 may determine a resolution for the failure. For instance, if the failure is related to new resources, business policy analyzer 104 may update a set of excluded resources, get new resources, and provision the network. If the failure is not related to new resources but because of existing network elements, and the existing network elements are not reachable, business policy analyzer 104 may determine to keep the old resources and provision the network. If the failure is due to semantic failures, business policy analyzer 104 may submit a negated intent, provision the network, and raise an alarm representing the semantic failure.

Thus, in general, business policy analyzer 104 ensures that there are no conflicting changes in an intent data model change. After ensuring that there are no conflicting changes, business policy analyzer 104 submits the intent data model changes to intent infrastructure 110. When stateless intent changes are submitted, intent infrastructure 110 may create a change set that holds the set of vertices updated (e.g., created, updated, or deleted) and corresponding version identifiers. Intent infrastructure 110 also maintains both a deployed intent data model and an undeployed intent data model in intent database 118. Intent infrastructure 110 triggers intent compiler 114 to execute translators of impacted vertices in the change set.

Translations may be asynchronous, and therefore, intent infrastructure 110 may ensure that intent changes do not override other intent changes, through the use of a global intent version. The global intent version signifies the version of the intent graph that generated the low-level model resources. Intent infrastructure 110 maintains the global intent version of the deployed graph model, along with the low-level model resources, e.g., in configuration database 120. If a newly generated low-level model global intent version is less than the global version on the low-level model, intent infrastructure 110 may rerun intent compiler 114. If there is any failure while element configuration service 116 commits low-level configuration data to the network, intent infrastructure 110 may provide data to business policy analyzer 104 representing the failure.

To support updates, intent infrastructure 110 supports versioning of intent data models, such as deployed and undeployed intent data models. Maintaining one version of a complete graph per change would serialize the intent changes. Thus, intent infrastructure 110 maintains the deployed and undeployed intent data models, including deployed vertices and undeployed vertices respectively, within the same graph. Each vertex contains a state and a version-id. Intent infrastructure 110 may set the state values for vertices corresponding to intent changes to represent states of "created," "updated," or "deleted." Intent infrastructure 110 may also set state a state value to represent "deployed" once the vertex has been deployed, as discussed below.

Intent infrastructure 110 may maintain updated vertices within the same graph. As noted above, intent infrastructure 110 may maintain a snapshot table containing a list of universally unique identifiers (UUIDs) and old versions of corresponding updated vertices.

When a vertex is created, intent infrastructure 110 sets the state value of the created vertex to a value representing a "created" state. After the vertex is deployed to the network, intent infrastructure 110 updates the state value to represent a "deployed" state.

When a vertex is updated, intent infrastructure 110 sets the state value of the updated vertex to a value representing an "updated" state. After the vertex is deployed to the network, intent infrastructure 110 updates the state value to represent a "deployed" state.

When a vertex is deleted, intent infrastructure 110 sets the state value of the created vertex to a value representing a "deleted" state. After deploying updates to the network, intent infrastructure 110 removes the deleted vertex from the graph.

The following table represents example state transitions:

| State | If version == version in change set | If version != version in change set |
| --- | --- | --- |
| Create | Deployed | Update |
| Update | Deployed | Update |
| Delete | Remove from graph | NA |

Figure 5:
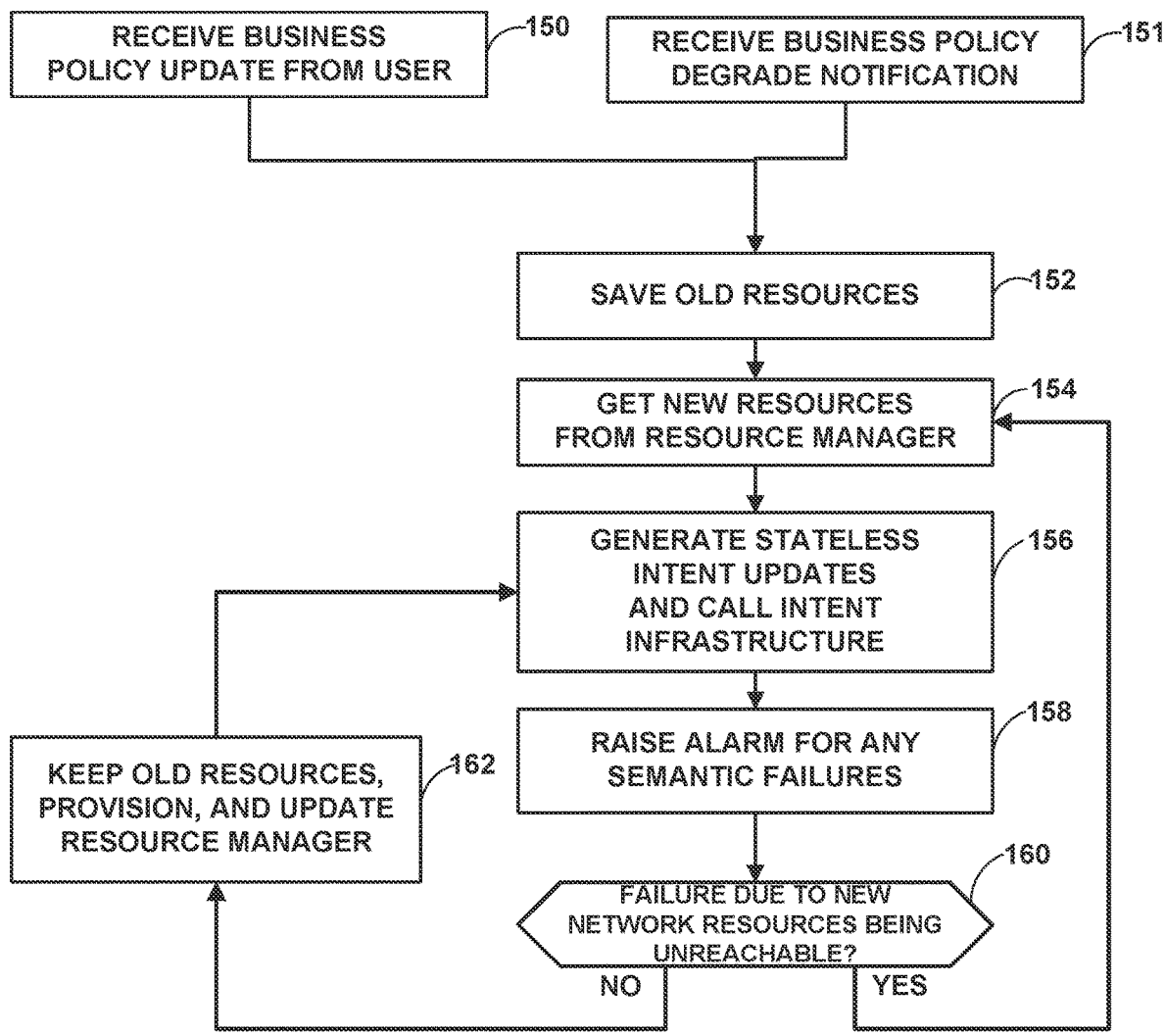
FIG. 5 is a flowchart illustrating an example method that may be performed by a business policy analyzer for addressing failures to intent updates.

FIG. 5 is a flowchart illustrating an example method that may be performed by business policy analyzer 104 for addressing failures to intent updates. Initially, business policy analyzer 104 may receive a business policy update from a user (150). Alternatively, business policy analyzer 104 may receive a degrade notification from assurance module 106 (151). In either case, business policy analyzer 104 saves the old resources (152) for the existing intents. Business policy analyzer 104 further determines new resources for the intents (e.g., new intents or existing intents for which resources are degraded) from a resource manager (154) and provisions the new resources.

Business policy analyzer 104 may then generate stateless intent updates and call intent infrastructure 110 (156). This may cause intent infrastructure 110 to translate the intent changes using intent compiler 114 and to update intent database 118. Furthermore, element configuration service 116 may distribute low-level configuration data updates and update configuration database 120.

If there are any intent realization failures, business policy analyzer 104 may determine the failures and attempt to resolve the failures. In particular, business policy analyzer 104 may raise an alarm for semantic failures (158), which may include sending a message to a user representative of the semantic failures. For other failures, business policy analyzer 104 may determine whether the failure is due to unreachable network resources (e.g., elements 14) (160). If a failure is due to new network resources unreachable ("YES" branch of 160), business policy analyzer 104 may update a set of excluded resources, get new resources (154), then again generate stateless intent updates and call intent infrastructure 110 (156). Otherwise, if the failure is not related to new resources but because of existing network elements, and the existing network elements are not reachable ("NO" branch of 160), business policy analyzer 104 may determine to keep the old resources, then again generate stateless intent updates and call intent infrastructure 110 (156).

Figure 6:
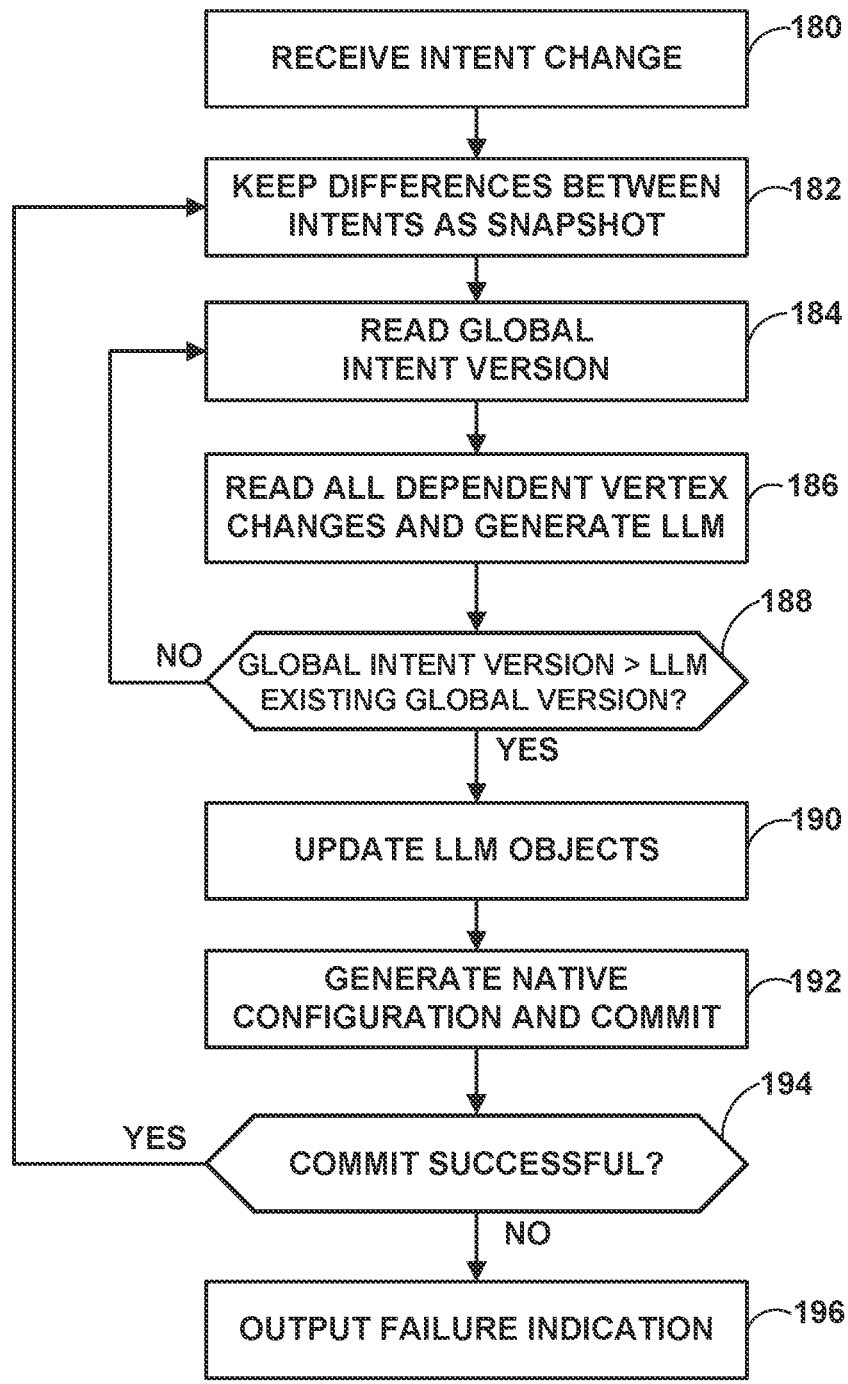
FIG. 6 is a flowchart illustrating an example method for concurrent stateless intent provisioning in accordance with the techniques of this disclosure.

FIG. 6 is a flowchart illustrating an example method for concurrent stateless intent provisioning in accordance with the techniques of this disclosure. The method of FIG. 6 may be performed by, e.g., controller device 10 of FIGS. 1 and 2.

Initially, controller device 10 may receive an intent change (180), e.g., from an application. Management module 24 may maintain a difference between a deployed graph model and an undeployed graph model (that is, differences between intents) as a snapshot table in configuration database 40 (182). Management module 24 may read the global intent version, where a timestamp of a current time at creation of the global intent may signify the version value (184).

Translation module 28 may read all dependent vertex changes and generate the low-level model (LLM) (186).

Management module 24 may determine whether the global intent version is greater than the LLM existing global version (188). If the global intent version is greater than the LLM existing global version ("YES" branch of 188), configuration module 26 may update the LLM objects (190). If the global intent version is not greater (e.g., is less) than the LLM existing global version ("NO" branch of 188), management module 24 may again read the global intent version (184) and rerun translation module 28 and proceed. Configuration module 26 may further generate native configuration data from the LLM objects and commit the native configuration data (192) to elements 14.

Management module 24 may further determine whether the commit was successful (194). If the commit was not successful ("NO" branch of 194), management module 24 may output a failure indication to the application (196). Otherwise, if the commit was successful ("YES" branch of 194), management module 24 may update the deployed intent data model with the previous undeployed intent data model, update the snapshot, and await new intents.

Figure 7:
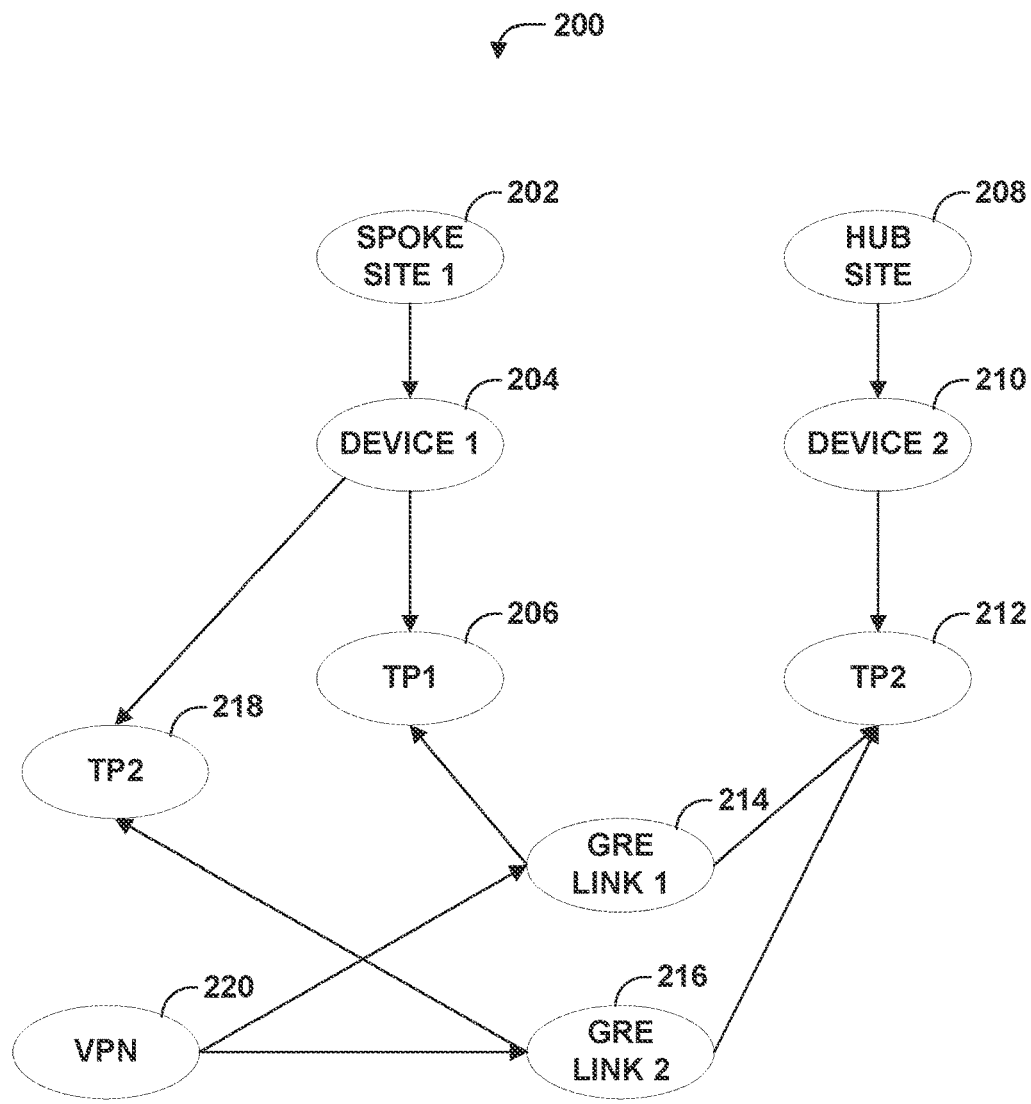
FIG. 7 is a graph illustrating an example undeployed intent graph following intent changes.

FIG. 7 is a graph illustrating an example undeployed intent graph 200 following intent changes. In this example, undeployed intent graph 200 includes spoke site 1 vertex 202, device 1 vertex 204, termination point 1 (TP1) vertex 206, hub site vertex 208, device 2 vertex 210, TP2 vertex 212, GRE link 1 vertex 214, GRE link 2 vertex 216, TP2 vertex 218, and VPN vertex 220.

In general, a deployed intent graph (not shown) and undeployed intent graph 200 may correspond to an SD-WAN. The SD-WAN has site objects, e.g., represented by spoke site 1 vertex 202 and hub site 208. The sites can be connected via hub and spoke or full mesh. In this example, the sites are connected with a GRE overlay, and optionally can have IPSEC enabled. There may also be a WAN underlay link across the sites.

In a further example, a GRE tunnel may be created. Thus, translation module 28 may execute a translator named, for example, "compile_gre_link." The available resources may include a site, GRE link, GRE termination point, IPSEC link and termination point, and peer site termination point. Translation module 28 may output abstract configuration and corresponding native configuration, e.g., as follows:

set groups green_green-SpkVsrx1_WAN_2_green—SpkVsrx2_WAN_2_GRE_IPSEC_0 security zones security-zone trust tcp-rst
set groups green_green-SpkVsrx1_WAN_2_green—SpkVsrx2_WAN_2_GRE_IPSEC_0 security zones security-zone trust host-inbound-traffic system-services all
set groups green_green-SpkVsrx1_WAN_2_green—SpkVsrx2_WAN_2_GRE_IPSEC_0 security zones security-zone trust host-inbound-traffic protocols all
set groups green_green-SpkVsrx1_WAN_2_green—SpkVsrx2_WAN_2_GRE_IPSEC_0 security zones security-zone trust interfaces gr-0/0/0.4001
set groups green_green-SpkVsrx1_WAN_2_green—SpkVsrx2_WAN_2_GRE_IPSEC_0 interfaces gr-0/0/0 unit 4001 tunnel source 172.30.48.3
set groups green_green-SpkVsrx1_WAN_2_green—SpkVsrx2_WAN_2_GRE_IPSEC_0 interfaces gr-0/0/0 unit 4001 tunnel destination 172.30.48.5
set groups green_green-SpkVsrx1_WAN_2_green—SpkVsrx2_WAN_2_GRE_IPSEC_0 interfaces gr-0/0/0 unit 4001 family inet address 10.0.48.1/31
set groups green_green-SpkVsrx1_WAN_2_green—SpkVsrx2_WAN_2_GRE_IPSEC_0 interfaces gr-0/0/0 unit 4001 family mpls
set groups green_green-SpkVsrx1_WAN_2_green—SpkVsrx2_WAN_2_GRE_IPSEC_0 interfaces gr-0/0/0 unit 4001 tunnel routing-instance destination transit
set groups green_green-SpkVsrx1_WAN_2_green—SpkVsrx2_WAN_2_GRE_IPSEC_0 protocols oam gre-tunnel interface gr-0/0/0.4001 keepalive-time 1
set groups green_green-SpkVsrx1_WAN_2_green—SpkVsrx2_WAN_2_GRE_IPSEC_0 protocols oam gre-tunnel interface gr-0/0/0.4001 hold-time 5
set groups green_green-SpkVsrx1_WAN_2_green—SpkVsrx2_WAN_2_GRE_IPSEC_0 routing-instances transit interface gr-0/0/0.4001
set apply-groups green_green-SpkVsrx1_WAN_2_green—SpkVsrx2_WAN_2_GRE_IPSEC_0

In addition, according to the example above, a dynamic VPN may be used, where the dynamic VPN represents a tunnel created between sites only when traffic starts to flow. In a full mesh topology, traffic may begin between sites 1 and 2, corresponding respectively to spoke site 1 vertex 202 and hub site 2 vertex 208. Controller device 10 may detect the traffic flow and trigger GRE/IPSEC tunnel creation between sites 1 and 2. Controller device 10 may add an underlay link between termination points of sites 1 and 2 as an intent update, e.g., (site1 WAN-0<->site2 WAN-0). Controller device 10 may also add logical termination points (e.g., interfaces—gr/0/0/0 and st.4000) for overlays in sites 1 and 2. Controller device 10 may further add corresponding GRE and IPSEC links between sites 1 and 2.

Thus, the corresponding deployed intent graph may omit GRE link 1 vertex 214 and have a different version of VPN vertex 220. That is, GRE link 1 vertex 214 may have been added relative to the deployed intent graph (corresponding to the example created GRE tunnel), and VPN vertex 214 may have been modified relative to the deployed intent graph. Moreover, GRE link 2 vertex 216 may be deleted from the deployed intent graph. Accordingly, management module 24 of controller device 10 may set a state for GRE link 1 214 to "created," a state for VPN vertex 220 to "updated," and a state for GRE link 2 vertex 216 to "deleted." After deploying configuration data based on undeployed intent graph 200 to the network, management module 24 may set the states for GRE link 1 214 and VPN vertex 220 to "deployed," and delete GRE link 2 vertex 216 from the graph.

A failure may result if either or both of devices corresponding to device 1 vertex 204 ("d1") or device 2 vertex 210 ("d2") are not reachable. If either or both of d1 and/or d2 are not reachable, controller device 10 would remove the link between site 1 and site 2 (e.g., site1 WAN-0<->site2 WAN-0).

In this example, the transaction may be maintained for the link between sites 1 and 2. To achieve this, either controller device 10 would not allow edits in the hub and spoke topology or the VPN network (department) should not be edited. Conventional techniques would impact business policy SLA if the VPN is updated.

The following is an example reactive mapper for IPSEC for the example use case above:

```
name: ipsec
version: 2015-04-30
description: Simple template to compile ipsec model
resource_context : site
resources :
  -
    name: spoke_device
    query: site(site_id){
        name
        device{
            name
        }
    }
    dependent_resources: gre_link
  -
    name: gre_link
    query: site(site_id) {
        name
        device{
            name
            termination_point[type:logical]{
                name
                link[type:gre] {
                    termination_point[type:physical]{
                        name
                    }
                }
            }
        }
    }
  -
    name: customer_settings
    input_resources:
        - spoke_device
    rest_api:
        method: GET
    service_name: local.csp-ems-central
    uri: /ems-central/customer/{ {spoke_device.owner} }
    Output:
        //Template code to update the Low-level model.
        //To reference global version use $global_version
```

Figure 8:
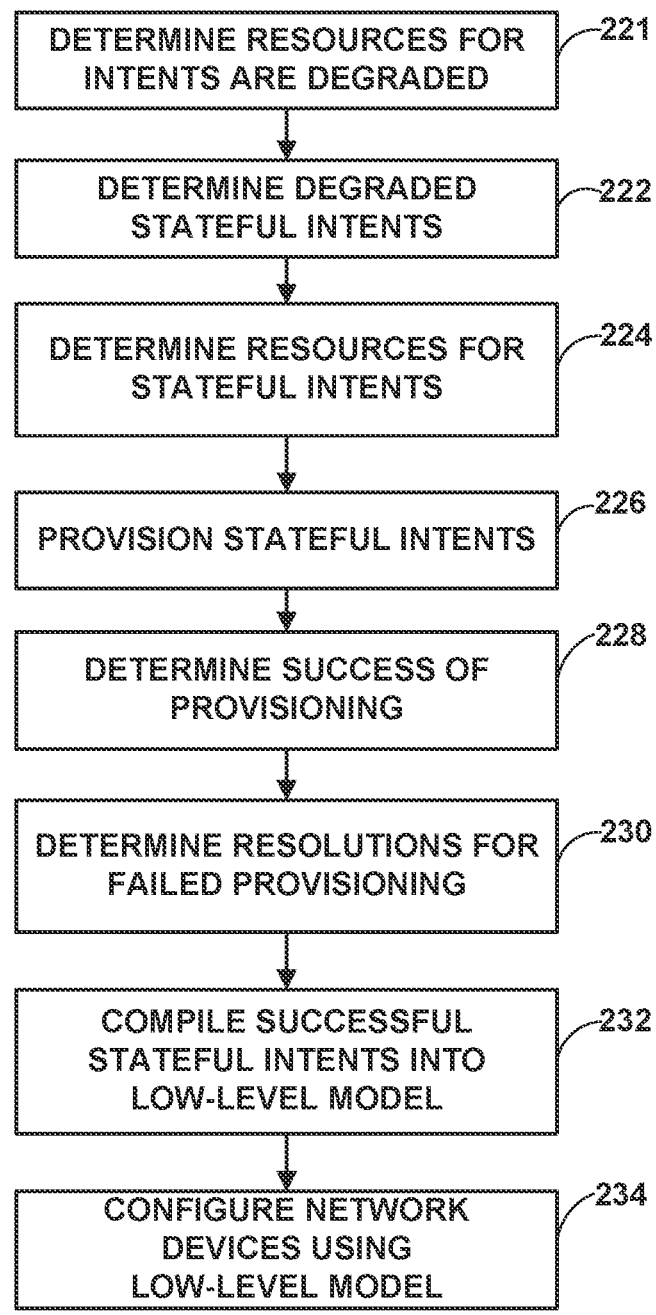
FIG. 8 is a flowchart illustrating an example method of configuring network devices according to techniques of this disclosure.

FIG. 8 is a flowchart illustrating an example method of configuring network devices according to techniques of this disclosure. The method of FIG. 8 is explained with respect to controller device 10 of FIGS. 1 and 2, although other devices (e.g., conforming to model 100 of FIG. 4) may be configured to perform this or a similar method.

Management module 24 may maintain a deployed graph model in configuration database 40. As discussed above, the deployed graph model includes a graph of vertices connected by edges, where the vertices may correspond to network resources such as devices, connections, services, and the like. The deployed graph model may represent a set of existing stateful intents.

Management module 24 may then receive an indication that resources for one or more intents are degraded (221). Management module 24 may determine any existing stateful intents that become degraded as a result of the degraded resources (222).

Management module 24 may further determine new resources for the stateful intents (224). Management module 24 then provisions the stateful intents using the determined resources (226).

Management module 24 may then determine whether the provisioning was successful (228). Management module 24 may determine resolutions for failed provisioning (230), e.g., as discussed above with respect to FIG. 5. For example, for semantic failures, management module 24 may raise an alarm. As another example, for unreachable network resources, management module 24 may update an exclude list and get new resources.

Management module 24 may cause translation module 28 to compile successful stateful intents into a low-level model (232). In particular, translation module 28 may determine whether versions of vertices in the undeployed graph model match corresponding change set versions, and if not, execute corresponding reactive mappers to compile corresponding elements of the change set Management module 24 may also cause configuration module 26 to configure elements 14 using the low-level model (234). After configuring elements 14 according to the resulting low-level model, management module 24 may update the deployed graph model to the undeployed graph model and await stateful intents.

In this manner, the method of FIG. 8 represents an example of a method including determining, by a controller device that manages a plurality of network devices, that one or more stateful intents used to manage the plurality of network devices and represented by a graph model are degraded due to assigned resources for the stateful intents having become degraded; in response to determining that the one or more stateful intents are degraded, determining, by the controller device, resources for the stateful intents, the resources corresponding to vertices of the graph model; provisioning, by the controller device, the stateful intents using the determined resources; determining, by the controller device, whether the provisioning of the stateful intents was successful; compiling, by the controller device, at least one of the stateful intents that was successful into low-level configuration data for at least one network device of the plurality of network devices; and configuring, by the controller device, the at least one network device using the low-level configuration data.

Figure 9:
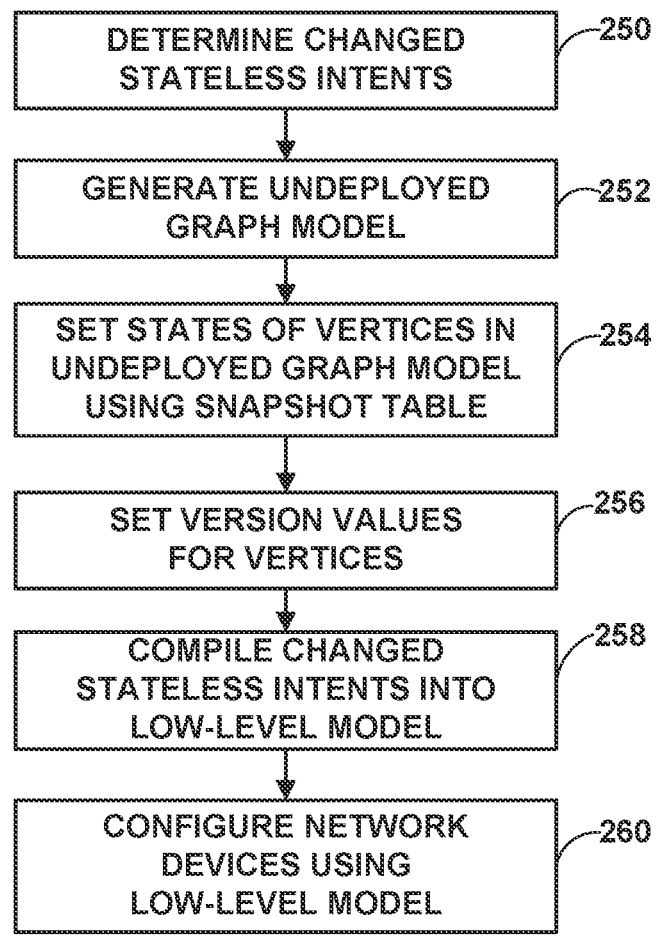
FIG. 9 is a flowchart representing an example of another method of configuring network devices according to techniques of this disclosure.

FIG. 9 is a flowchart representing an example of another method of configuring network devices according to techniques of this disclosure. The method of FIG. 9 is explained with respect to controller device 10 of FIGS. 1 and 2, although other devices (e.g., conforming to model 100 of FIG. 4) may be configured to perform this or a similar method.

As discussed above, management module 24 may maintain a deployed graph model in configuration database 40. As discussed above, the deployed graph model includes a graph of vertices connected by edges, where the vertices may correspond to network resources such as devices, connections, services, and the like. The deployed graph model may represent a set of existing stateless intents.

Management module 24 may receive new stateless intents and determine changed stateless intents relative to the existing stateless intents (250). Management module 24 may maintain both a deployed graph model representing the currently deployed stateless intents, as well as an undeployed graph model representing the new stateless intents (252). Management module 24 may set states of vertices in the undeployed graph model using a snapshot table as discussed above (254). For example, management module 24 may set states for created vertices of the undeployed graph model to values representing a "create" state, values for updated vertices relative to the deployed graph model to values representing an "update" state, and values for deleted vertices relative to the deployed graph model to values representing a "delete" state. Management module 24 may also set version values for the vertices (256).

Management module 24 may then cause translation module 28 to compile the changed stateless intents into a low-level model (258). Management module 24 may also cause configuration unit 26 to configure elements 14 (that is, network devices) using the low-level model (260).

In this manner, the method of FIG. 9 represents an example of a method including determining, by a controller device that manages a plurality of network devices, that one or more stateless intents of a deployed graph model including a first set of stateless intents used to manage the plurality of network devices have changed, wherein stateless intents comprise fully declarative descriptions of an intended state of a network including the network devices, state of one or more of the network devices, or state of storage for the network; maintaining, by the controller device, both the deployed graph model and an undeployed graph model including a second set of stateless intents including the one or more changed stateless intents; compiling, by the controller device, the changed stateless intents of the undeployed graph model to generate low-level configuration data for the network devices; and configuring, by the controller device, the network devices using the low-level configuration data.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   determining, by a controller device that manages a plurality of network devices, that one or more stateless intents of a deployed graph model including a first set of stateless intents used to manage the plurality of network devices have changed, wherein the one or more stateless intents represent intended states of network devices;
   maintaining, by the controller device, the deployed graph model, an undeployed graph model including a second set of stateless intents including the one or more changed stateless intents, version values for the deployed graph model and the undeployed graph model, and version values for vertices of the deployed graph model and version values for vertices of the undeployed graph model;
   determining, by the controller device, that a new global version is less than an existing global version;
   in response to determining that the new global version is less than the existing global version:
      recompiling, by the controller device, the one or more changed stateless intents of the undeployed graph model to generate low-level configuration data for the network devices; and
      configuring, by the controller device, the network devices using the low-level configuration data.

2. The method of claim 1, wherein recompiling comprises recompiling two or more of the one or more changed stateless intents that were changed concurrently such that the two or more of the one or more changed stateless intents do not invalidate each other.

3. The method of claim 1, further comprising replacing the deployed graph model with the undeployed graph model after configuring the network devices and sending a deployment reply message.

4. The method of claim 1, further comprising:
   maintaining a snapshot table including a list of universally unique identifiers (UUIDs) of the vertices of the undeployed graph model;
   when a first vertex of the vertices of the undeployed graph model is created, setting a state for the first vertex in the snapshot table to a value representing a create state;

when a second vertex of the vertices of the undeployed graph model is updated, setting a state for the second vertex in the snapshot table to a value representing an update state; and when a third vertex of the vertices of the undeployed graph model is deleted, setting a state for the third vertex in the snapshot table to a value representing a delete state.

5. The method of claim 4, further comprising, after deploying the undeployed graph model:

updating the state for the first vertex to a value representing a deployed state;

updating the state for the second vertex to the value representing the deployed state; and deleting the third vertex.

6. The method of claim 1, wherein recompiling the one or more changed stateless intents further comprises recompiling dependent stateless intents that depend from one or more of the one or more changed stateless intents according to a dependency graph.

7. A controller system that manages a plurality of network devices, the controller system comprising one or more processing units implemented in circuitry and configured to:

determine that one or more stateless intents of a deployed graph model including a first set of stateless intents used to manage the plurality of network devices have changed, wherein the one or more stateless intents represent intended states of network devices;

maintain the deployed graph model, an undeployed graph model including a second set of stateless intents including the one or more changed stateless intents, version values for the deployed graph model and the undeployed graph model, and version values for vertices of the deployed graph model and version values for vertices of the undeployed graph model;

determine that a new global version is less than an existing global version;

in response to determining that the new global version is less than the existing global version:

recompile the one or more changed stateless intents of the undeployed graph model to generate low-level configuration data for the network devices; and configure the network devices using the low-level configuration data.

8. The controller system of claim 7, wherein the one or more processing units are configured to recompile two or more of the one or more changed stateless intents that were changed concurrently such that the two or more of the one or more changed stateless intents do not invalidate each other.

9. The controller system of claim 7, wherein the one or more processing units are further configured to replace the deployed graph model with the undeployed graph model after configuring the network devices and send a deployment reply message.

10. The controller system of claim 7, wherein the one or more processing units are further configured to:

maintain a snapshot table including a list of universally unique identifiers (UUIDs) of the vertices of the undeployed graph model;

when a first vertex of the vertices of the undeployed graph model is created, set a state for the first vertex in the snapshot table to a value representing a create state;

when a second vertex of the vertices of the undeployed graph model is updated, set a state for the second vertex in the snapshot table to a value representing an update state; and when a third vertex of the vertices of the undeployed graph model is deleted, set a state for the third vertex in the snapshot table to a value representing a delete state.

11. The controller system of claim 10, wherein the one or more processing units are further configured to, after deploying the undeployed graph model:

update the state for the first vertex to a value representing a deployed state;

update the state for the second vertex to the value representing the deployed state; and delete the third vertex.

12. The controller system of claim 7, wherein to recompile the one or more changed stateless intents, the one or more processing units are further configured to recompile dependent stateless intents that depend from one or more of the one or more changed stateless intents according to a dependency graph.

13. A computer-readable storage medium comprising instructions that, when executed, cause a processor of a controller device that manages a plurality of network devices to:

determine that one or more stateless intents of a deployed graph model including a first set of stateless intents used to manage the plurality of network devices have changed, wherein the one or more changed stateless intents represent intended states of network devices;

maintain the deployed graph model, an undeployed graph model including a second set of stateless intents including the one or more changed stateless intents, version values for the deployed graph model and the undeployed graph model, and version values for vertices of the deployed graph model and version values for vertices of the undeployed graph model;

determine that a new global version is less than an existing global version;

in response to determining that the new global version is less than the existing global version:

recompile the one or more changed stateless intents of the undeployed graph model to generate low-level configuration data for the network devices; and configure the network devices using the low-level configuration data.

14. The computer-readable storage medium of claim 13, wherein the instructions that cause the processor to recompile the one or more changed stateless intents comprise instructions that cause the processor to recompile two or more of the one or more changed stateless intents that were changed concurrently such that the two or more of the one or more changed stateless intents do not invalidate each other.

15. The computer-readable storage medium of claim 13, further comprising instructions that cause the processor to replace the deployed graph model with the undeployed graph model after configuring the network devices and send a deployment reply message.

16. The computer-readable storage medium of claim 13, further comprising instructions that cause the processor to:

maintain a snapshot table including a list of universally unique identifiers (UUIDs) of the vertices of the undeployed graph model;

when a first vertex of the vertices of the undeployed graph model is created, set a state for the first vertex in the snapshot table to a value representing a create state;

when a second vertex of the vertices of the undeployed graph model is updated, set a state for the second vertex in the snapshot table to a value representing an update state;

when a third vertex of the vertices of the undeployed graph model is deleted, set a state for the third vertex in the snapshot table to a value representing a delete state; and after deploying the undeployed graph model:
    update the state for the first vertex to a value representing a deployed state;
    update the state for the second vertex to the value representing the deployed state; and
    delete the third vertex.

17. The computer-readable storage medium of claim 13, wherein the instructions that cause the processor to recompile the one or more changed stateless intents comprise instructions that cause the processor to recompile dependent stateless intents that depend from one or more of the one or more changed stateless intents according to a dependency graph.

\* \* \* \* \*